United States Patent [19]
Anderson et al.

[11] Patent Number: 6,134,606
[45] Date of Patent: *Oct. 17, 2000

[54] SYSTEM/METHOD FOR CONTROLLING PARAMETERS IN HAND-HELD DIGITAL CAMERA WITH SELECTABLE PARAMETER SCRIPTS, AND WITH COMMAND FOR RETRIEVING CAMERA CAPABILITIES AND ASSOCIATED PERMISSIBLE PARAMETER VALUES

[75] Inventors: Eric Anderson, San Jose; Patricia Scardino, Fremont, both of Calif.

[73] Assignee: FlashPoint Technology, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/900,486

[22] Filed: Jul. 25, 1997

[51] Int. Cl.⁷ .............................. G03F 3/00; G03B 17/00; G03B 17/18; G03B 17/48; G06F 15/16
[52] U.S. Cl. ................................. 710/14; 710/8; 710/10; 396/57; 396/297; 709/228; 703/27
[58] Field of Search ................................ 396/48, 57, 281, 396/297, 429; 710/8, 10, 14; 709/227, 228; 703/27

[56] References Cited

U.S. PATENT DOCUMENTS

| | | | |
|---|---|---|---|
| 4,403,303 | 9/1983 | Howes et al. | 364/900 |
| 4,823,283 | 4/1989 | Diehm et al. | 364/518 |
| 5,142,319 | 8/1992 | Wakabayashi et al. | 354/465 |
| 5,159,364 | 10/1992 | Yanagisawa et al. | 354/21 |
| 5,179,653 | 1/1993 | Fuller | 395/156 |
| 5,224,207 | 6/1993 | Filion et al. | 395/101 |
| 5,270,821 | 12/1993 | Samuels | 358/188 |
| 5,311,240 | 5/1994 | Wheeler | 354/402 |
| 5,390,314 | 2/1995 | Swanson | 395/500 |
| 5,416,556 | 5/1995 | Suzuki et al. | 354/400 |
| 5,475,428 | 12/1995 | Hintz et al. | 348/263 |
| 5,475,441 | 12/1995 | Parulski et al. | 348/552 |
| 5,477,264 | 12/1995 | Sarbadhikari et al. | 348/231 |
| 5,493,335 | 2/1996 | Parulski et al. | 348/233 |
| 5,495,559 | 2/1996 | Makino | 395/112 |
| 5,534,975 | 7/1996 | Stefik et al. | 355/202 |
| 5,541,656 | 7/1996 | Kare et al. | 348/334 |
| 5,594,524 | 1/1997 | Sasagaki et al. | 396/287 |
| 5,659,547 | 8/1997 | Scarr et al. | 395/182.02 |
| 5,684,511 | 11/1997 | Westerink et al. | 345/157 |
| 5,784,177 | 7/1998 | Sanchez et al. | 358/468 |
| 5,790,800 | 8/1998 | Gauvin et al. | 395/200.57 |
| 5,822,581 | 10/1998 | Christeson | 395/651 |
| 5,848,193 | 12/1998 | Garcia | 382/232 |
| 5,903,786 | 5/1999 | Goto | 396/297 |
| 6,006,039 | 12/1999 | Steinberg et al. | 396/57 |
| 6,037,972 | 3/2000 | Horiuchi et al. | 348/64 |

OTHER PUBLICATIONS

NEC PC–DC401 Digital Still Camera, AppleLink Newbytes, Martyn Williams, pp. 1–13.

Primary Examiner—Thomas C. Lee
Assistant Examiner—Tanh Quang Nguyen
Attorney, Agent, or Firm—Sawyer Law Group LLP

[57] ABSTRACT

A system and method for controlling parameters in an electronic imaging device comprises a series of parameter storage locations coupled to the imaging device for containing parameter value sets, a set of parameter commands for controlling the parameter value sets, and a parameter manager device for executing the set of parameter commands to control the parameters in the electronic imaging device.

29 Claims, 14 Drawing Sheets

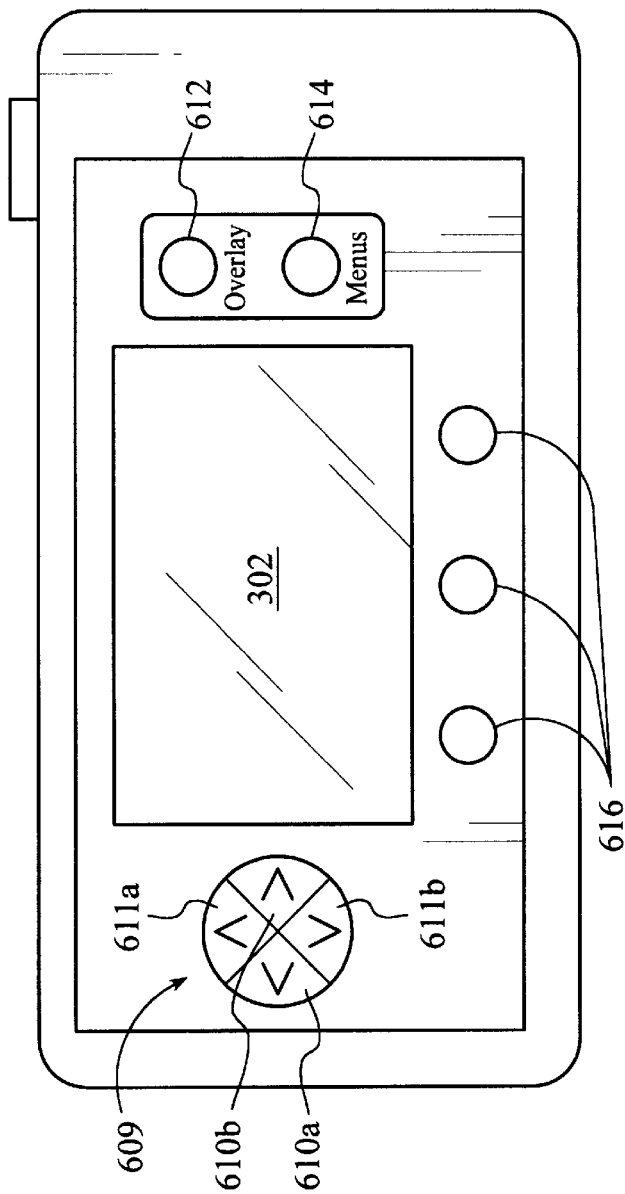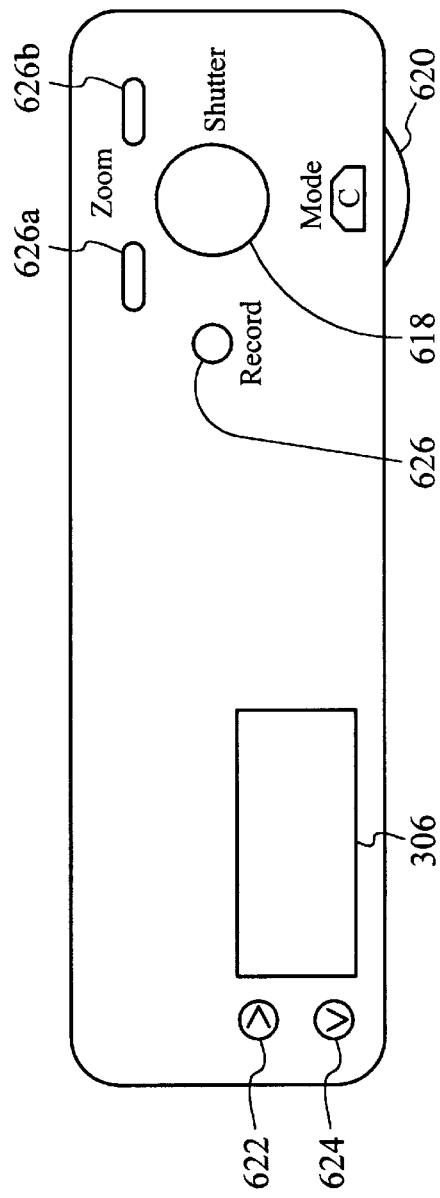
FIG. 6A
FIG. 6B

SYSTEM/METHOD FOR CONTROLLING PARAMETERS IN HAND-HELD DIGITAL CAMERA WITH SELECTABLE PARAMETER SCRIPTS, AND WITH COMMAND FOR RETRIEVING CAMERA CAPABILITIES AND ASSOCIATED PERMISSIBLE PARAMETER VALUES

BACKGROUND OF THE INVENTION

1. Field of the Invention

This invention relates generally to electronic imaging devices and more particularly to a system and method for controlling parameters in an electronic imaging device.

2. Description of the Background Art

Effective control of user preferences and system parameters is an important consideration for users, designers and manufacturers of many electronic devices and systems. Control of system parameters is particularly important in modern electronic imaging systems (such as digital camera devices) which often feature a substantial number of system parameters that are adjustable depending upon individual user preferences. Examples of such adjustable camera preferences include selectable exposure settings, image compression ratios, camera flash settings and zoom speed specifications.

Efficiently controlling the operating parameters of an electronic imaging device ideally allows the system user to capture image data of maximum quality. However, in order to consistently capture high-quality image data, the system for controlling camera operating parameters must be both flexible and powerful. System flexibility provides satisfactory methods to fulfill user needs and preferences, depending upon the current photographic environment. A powerful system results from efficiently providing techniques to control the operating parameters in a user-friendly and effective manner.

Some conventional imaging systems have adjustable operating parameters which are not retained after a system powerdown occurs. In portable imaging systems typically powered by batteries (for example, digital cameras), the system must remain constantly powered to retain current parameter settings (for example, an exposure setting). A system user must therefore risk battery failure at an inopportune moment, or repeatedly reset the desired operating parameters each time the imaging system is powered up.

Other conventional imaging systems have the ability to simply set a user preference which is then "remembered" as a default value after the system is powered down and subsequently powered up again. This implementation has a significant disadvantage because the default value is altered each time that a particular corresponding preference is adjusted. Since the default value directly tracks the current parameter setting, this particular implementation is relatively inflexible and ineffective from the system user's perspective.

Still other conventional imaging systems have limited capabilities to manipulate the various system operating parameters. For example, such imaging systems may lack the ability to selectively restore particular system defaults as required by a system user. In other words, the command set for controlling user preferences and operating parameters is not sufficiently powerful.

As the foregoing discussion suggests, effective and efficient functioning of an electronic imaging device may be enhanced by a flexible and powerful approach to controlling operating parameters. Therefore, an improved system and method are needed for controlling parameters in an electronic imaging device, according to the present invention.

SUMMARY OF THE INVENTION

In accordance with the present invention, a system and method are disclosed for controlling parameters in an electronic imaging device. In the preferred embodiment of the present invention, a digital camera includes a set of operating parameters which may be advantageously configured according to the demands of particular photographic environments. To allow system users to flexibly and effectively capture images, the adjustable operating parameters may be stored as parameter values in a series of discrete locations, including a factory defaults location, a user defaults location and a current parameters location. In the preferred embodiment, the factory defaults are stored in a non-volatile memory, the user defaults are stored in an electrically-erasable programmable read-only memory, and the current parameters are stored in a random-access memory. In alternate embodiments, parameter values may readily be stored using various other configurations and implementations.

In accordance with the present invention, a parameter manager may control the parameter values stored in the factory defaults location, the user defaults location and the current parameters location. The parameter manager typically controls the stored parameter values in response to a set of commands which may be generated by a central processing unit within the digital camera, by an external host computer which may be coupled to the digital camera via an input/output interface or by special parameter scripts provided on a removable memory device. In the preferred embodiment, the above-referenced commands include, but are not limited to, a GetState command, a SetState command, a GetDefault command, a SetDefault command and a RestoreDefault command.

The GetState command causes the parameter manager to access and send specified current parameters to either the camera's central processing unit or to the above-mentioned external command sources. The SetState command causes the parameter manager to set selected current parameters to a value specified by either the camera's central processing unit or by the above-mentioned external command sources. The GetDefault command causes the parameter manager to selectively access parameter values from either the user defaults or the factory defaults and then send the selected parameter values to either the camera's central processing unit or to the above-mentioned external command sources. The SetDefault command causes the parameter manager to set selected user defaults to a value obtained from either the camera's central processing unit, the above-mentioned external command sources, the current parameters or the factory defaults. The RestoreDefault command causes the parameter manager to restore the current parameters to values selectively obtained from either the user defaults or the factory defaults.

The factory defaults, the user defaults and the current parameters are therefore flexibly and efficiently controlled by the parameter manager through the SetState command, the GetState command, the GetDefault command, the SetDefault command and the Restore Default command. The present invention thus provides an improved system for controlling parameters in an electronic imaging device.

BRIEF DESCRIPTION OF THE DRAWINGS

FIG. 6A is an elevation view of one embodiment for the back of the FIG. 1 camera;

FIG. 6B is a plan view of one embodiment for the top of the FIG. 1 camera;

DETAILED DESCRIPTION OF THE PREFERRED EMBODIMENT

The present invention relates to an improvement in electronic imaging devices, including digital cameras. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. That is, any image capture device with displays images, icons and/or other items, could incorporate the features described hereinbelow and that device would be within the spirit and scope of the present invention. Thus, the present invention is not intended to be limited to the embodiment shown but is to be accorded the widest scope consistent with the principles and features described herein.

The present invention comprises a system and method for controlling parameters in an electronic imaging device and includes a series of parameter storage locations coupled to the imaging device for containing parameter value sets, a set of parameter commands for controlling the parameter value sets, and a parameter manager device for executing the set of parameter commands to control the parameters in the electronic imaging device, in accordance with the present invention.

Figure 1:
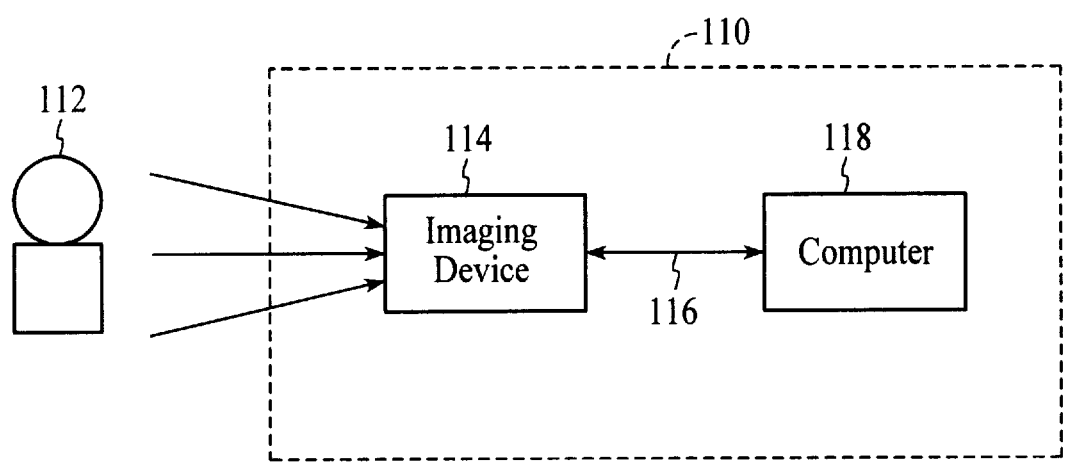
FIG. 1 is a block diagram of a digital camera, according to the present invention.

Referring now to FIG. 1, a block diagram of a digital camera 110 for use in accordance with the present invention is shown. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
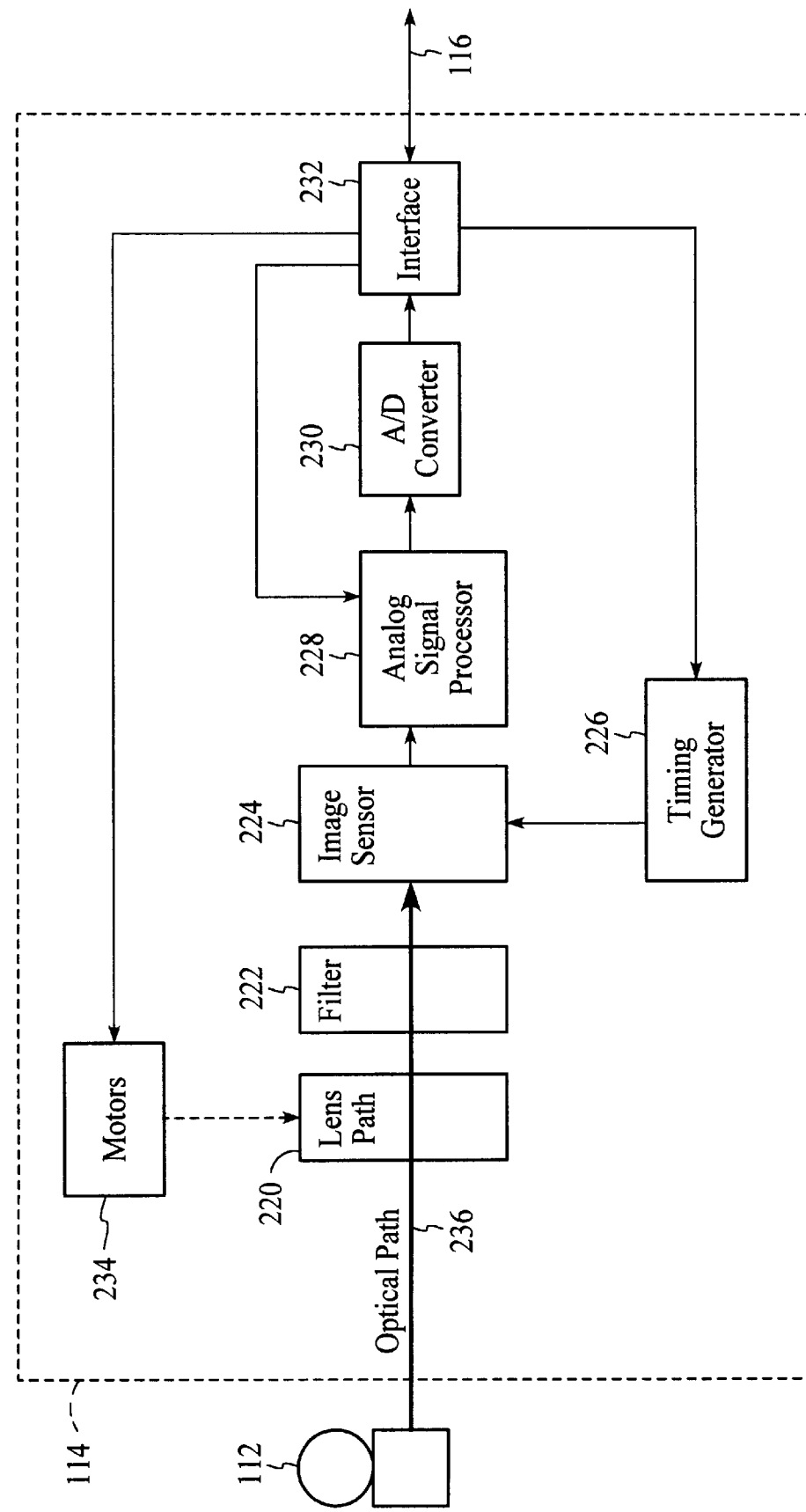
FIG. 2 is a block diagram of one embodiment for the imaging device of FIG. 1.

Referring now to FIG. 2, a block diagram of one embodiment of imaging device 114 is shown. Imaging device 114 typically comprises a lens 220 having an iris, a filter 222, an image sensor 224, a timing generator 226, an analog signal processor (ASP) 228, an analog-to-digital (A/D) converter 230, an interface 232, and one or more motors 234.

Imaging device 114 captures an image of object 112 via reflected light impacting image sensor 224 along optical path 236. Image sensor 224, which is typically a charge-coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
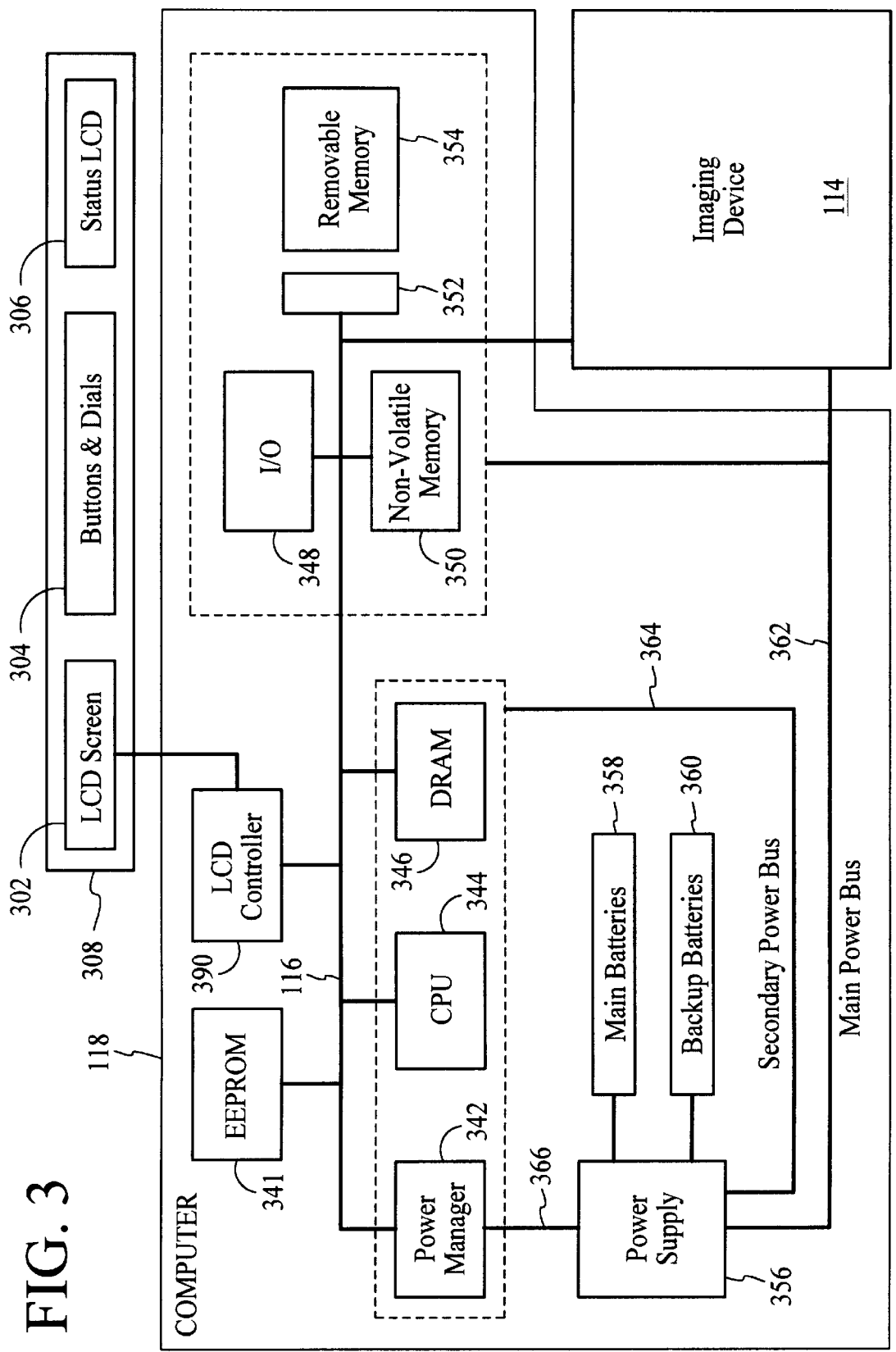
FIG. 3 is a block diagram of one embodiment for the computer of FIG. 1.

Referring now to FIG. 3, a block diagram of one embodiment for computer 118 is shown. System bus 116 provides connection paths between imaging device 114, electrically-erasable programmable read-only memory (EEPROM) 341, an optional power manager 342, central processing unit (CPU) 344, dynamic random-access memory (DRAM) 346, input/output interface (I/O) 348, non-volatile memory 350, and buffers/connector 352. Removable memory 354 connects to system bus 116 via buffers/connector 352. In alternate embodiments, camera 110 may also readily be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory which may be selectively allocated to various storage functions. LCD controller 390 accesses DRAM 346 and transfers processed image data to LCD screen 302 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 304, and an optional status LCD 306, which, in addition to LCD screen 302, are the hardware elements of the camera's user interface 308.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 4:
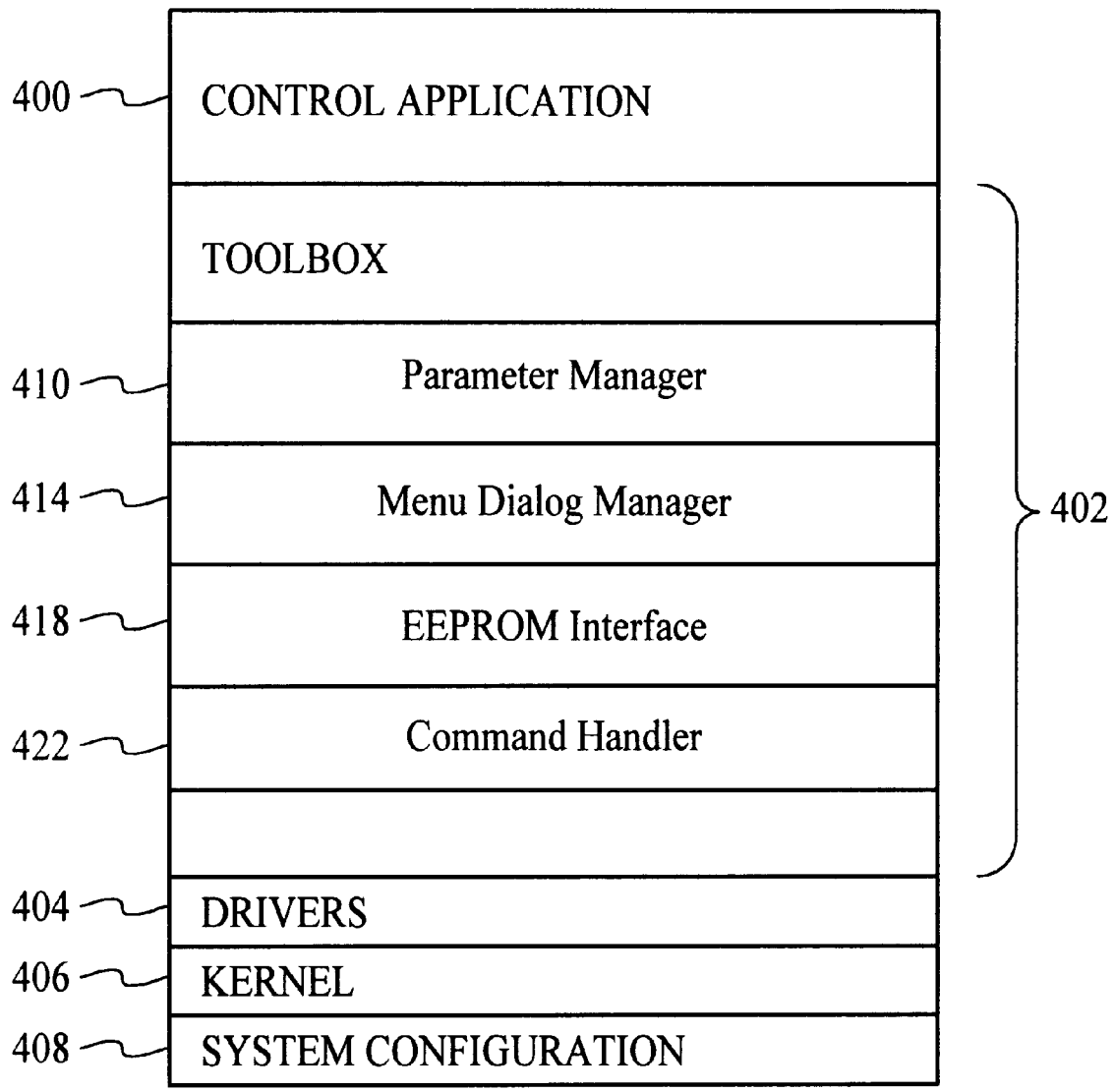
FIG. 4 is a memory map of one embodiment of the non-volatile memory of FIG. 3.

Referring now to FIG. 4, a memory map showing one embodiment of non-volatile memory 350 is shown. In the FIG. 4 embodiment, non-volatile memory 350 includes control application 400, toolbox 402, drivers 404, kernel 406 and system configuration 408. Control application 400 comprises program instructions for controlling and coordinating the various functions of camera 110. Toolbox 402 contains selected function modules including parameter manager 410, menu dialog manager 414, EEPROM interface 418 and command handler 422.

Parameter manager 410 includes software routines which control and coordinate various operating parameters in camera 110, according to the present invention. Parameter manager 410 is further discussed below in conjunction with FIGS. 8–13. Menu dialog manager 414 includes software routines which coordinate functions related to the user interface 308, including displaying information on LCD screen 302 and handling information input from buttons 304. EEPROM interface 418 coordinates communications to and from EEPROM 341 via system bus 116. Command handler 422 accesses and handles various system commands and advantageously provides the commands to the appropriate destination within camera 110. Selected commands are further discussed below in conjunction with FIGS. 8–13.

Drivers 404 control various hardware devices within camera 110 (for example, motors 234). Kernel 406 provides basic underlying services for the camera 110 operating system. System configuration 408 performs initial start-up routines for camera 110, including the boot routine and initial system diagnostics.

Figure 5:
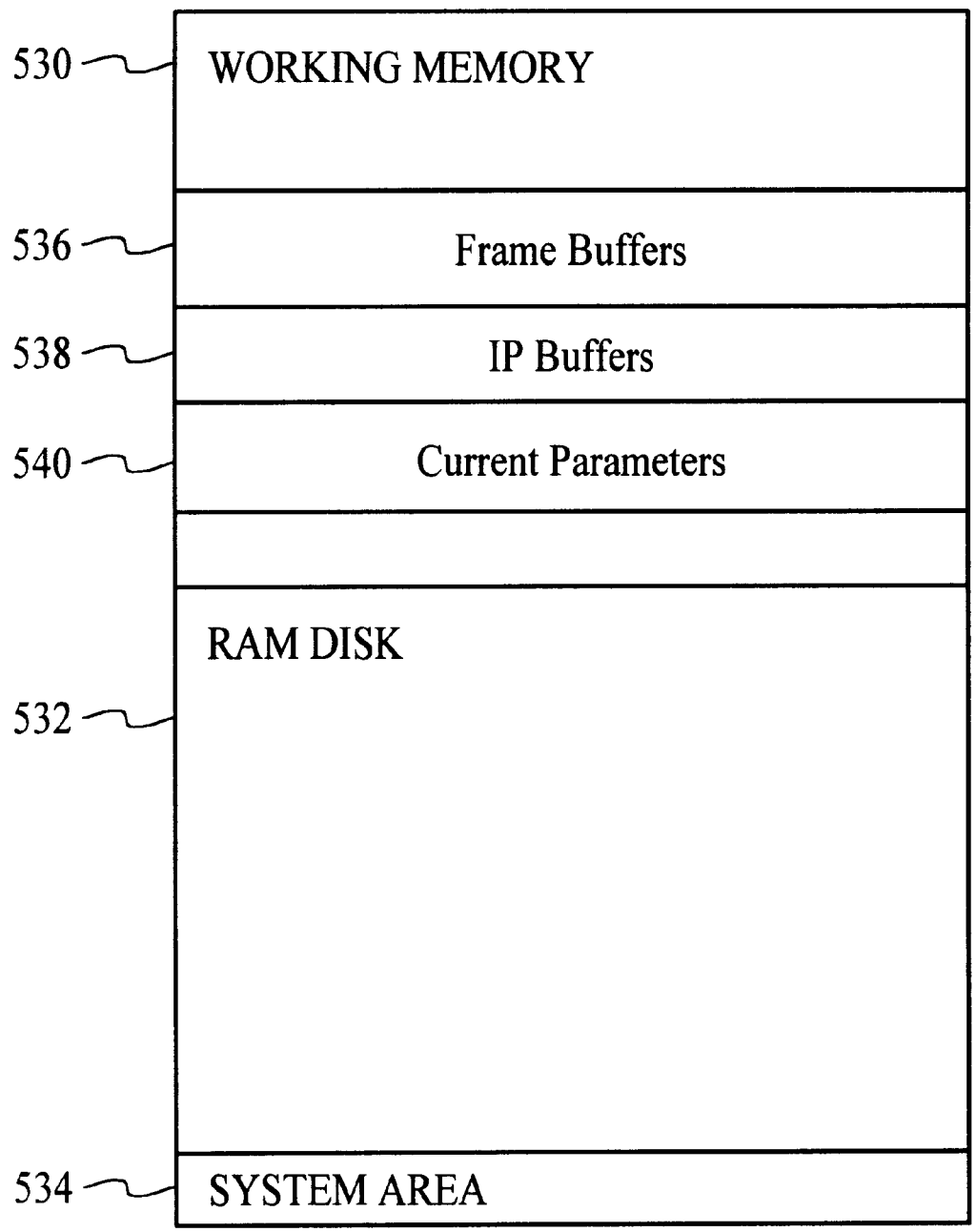
FIG. 5 is a memory map of one embodiment of the dynamic random-access memory of FIG. 3.

Referring now to FIG. 5, a memory map showing one embodiment of dynamic random-access-memory (DRAM) 346 is shown. In the FIG. 5 embodiment, DRAM 346 includes RAM disk 532, a system area 534, and working memory 530.

RAM disk 532 is a memory area used for storing raw and compressed image data and typically is organized in a "sectored" format similar to that of conventional hard disk drives. In the preferred embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Working memory 530 includes various stacks, data structures and variables used by CPU 344 while executing the software routines used within computer 118. Working memory 530 also includes input buffers 538 for initially storing sets of raw image data received from imaging device 114 for image conversion, and frame buffers 536 for storing data for display on the LCD screen 302.

In a preferred embodiment, a conversion process is performed by a live view generation program, which is stored in non-volatile memory 350 and executed on CPU 344. However, the conversion process can also be implemented using hardware. Referring again to FIG. 3, during the execution of the live view generation program (not shown), CPU 344 takes the raw image data from input buffers 538 in CCD format and performs color space conversion on the data. The conversions process performs gamma correction and converts the raw CCD data into either a RGB or YCC color format which is compatible with the LCD screen 402. After the conversion, CPU 344 stores the image data in frame buffers 536. The LCD controller 390 then transfers the processed image data from the frame buffers to the LCD screen 402 (via an optional analog converter) for display.

Working memory 346 further contains current parameters 540 which preferably include current settings for adjustable parameters in camera 110. Current parameters 540 are further discussed below in conjunction with FIG. 7 which includes a TABLE I listing examples of preferred current parameters 540.

FIGS. 6A and 6B are diagrams depicting the preferable hardware components of the user interface 308 of camera 110. FIG. 6A is a back view of camera 110 showing the LCD screen 302, a four-way navigation control button 609, an overlay button 612, a menu button 614, and a set of programmable soft keys 616. FIG. 6B is a top view of camera 110 showing a shutter button 618, and a mode dial 620. The camera may optionally include status LCD 306, status LCD scroll and select buttons 622 and 624, a sound record button 626, and zoom-in, zoom-out buttons 626a and 626b.

The user interface 308 includes several different operating modes for supporting various camera functions. However, the modes relevant to this description are review mode, menu mode, and capture (record) mode. In review mode, the camera 110 supports the actions of reviewing camera contents, editing and sorting images, and printing and transferring images. In menu mode, the camera 110 allows the user to manipulate camera settings and to edit and organize captured images. In capture mode, the camera 110 supports the actions of preparing to capture an image, and capturing an image through the use of either the LCD screen 302 or the status LCD 306.

The user switches between the review, menu, and capture modes, using the mode dial 620. When the camera is placed into a particular mode, that mode's default screen appears in the LCD screen 302 in which a set of mode-specific items, such as images, icons, and text, are displayed.

Figure 7:
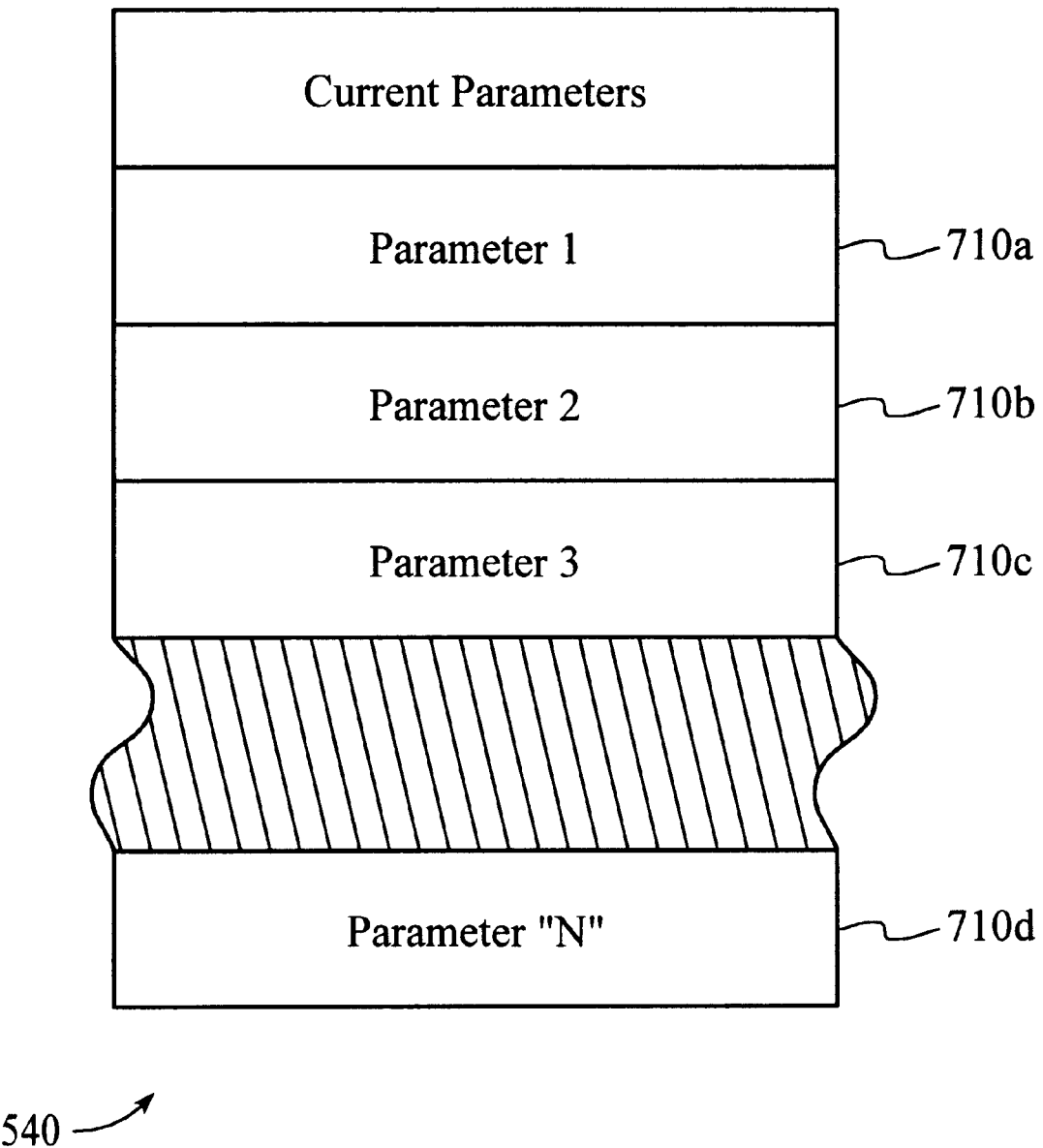
FIG. 7 is a memory map of one embodiment for the current parameters of FIG. 5.

Referring now to FIG. 7, a memory map of one embodiment for current parameters 540 of FIG. 5 is shown. Current parameters 540 comprise parameter 1 (710 (a)) through parameter "N" (710(d)) which each preferably include, but are not limited to, current settings for various operational and functional attributes of camera 110. Specific preferred examples for parameter 1 (710(a)) through parameter "N" (710(d)) are provided and described below in TABLE I. However, various other parameters not listed in TABLE I may readily be implemented in alternate embodiments of the present invention.

TABLE I

| PNAME | DESCRIPTION | VALUE TYPE | VALUE RANGE |
|-------|-------------|------------|-------------|
| xmod | Exposure mode specification | UInteger List | 1 = Auto<br>2 = Shutter priority<br>3 = Aperture priority<br>4 = Gain priority<br>5 = Manual |
| fmod | Focus mode specification | UInteger List | 1 = Auto<br>2 = Program<br>3 = Manual |
| smod | Strobe mode specification | UInteger List | 0 = Off<br>1 = Auto<br>2 = Fill<br>3 = Slave<br>4 = Sync |
| zpos | Zoom position specification | UInteger List | 100 = 1× (no zoom)<br>200 = 2×<br>300 = 3× |
| shut | Shutter speed specification; measured in steps, with 16666 being equivalent to 1/60 second | UInteger | 125 through 4000000 |
| fdst | Focus distance specification; measured in centimeters, with 65535 being infinity | UInteger | 30 through 65535 |

Figure 8A:
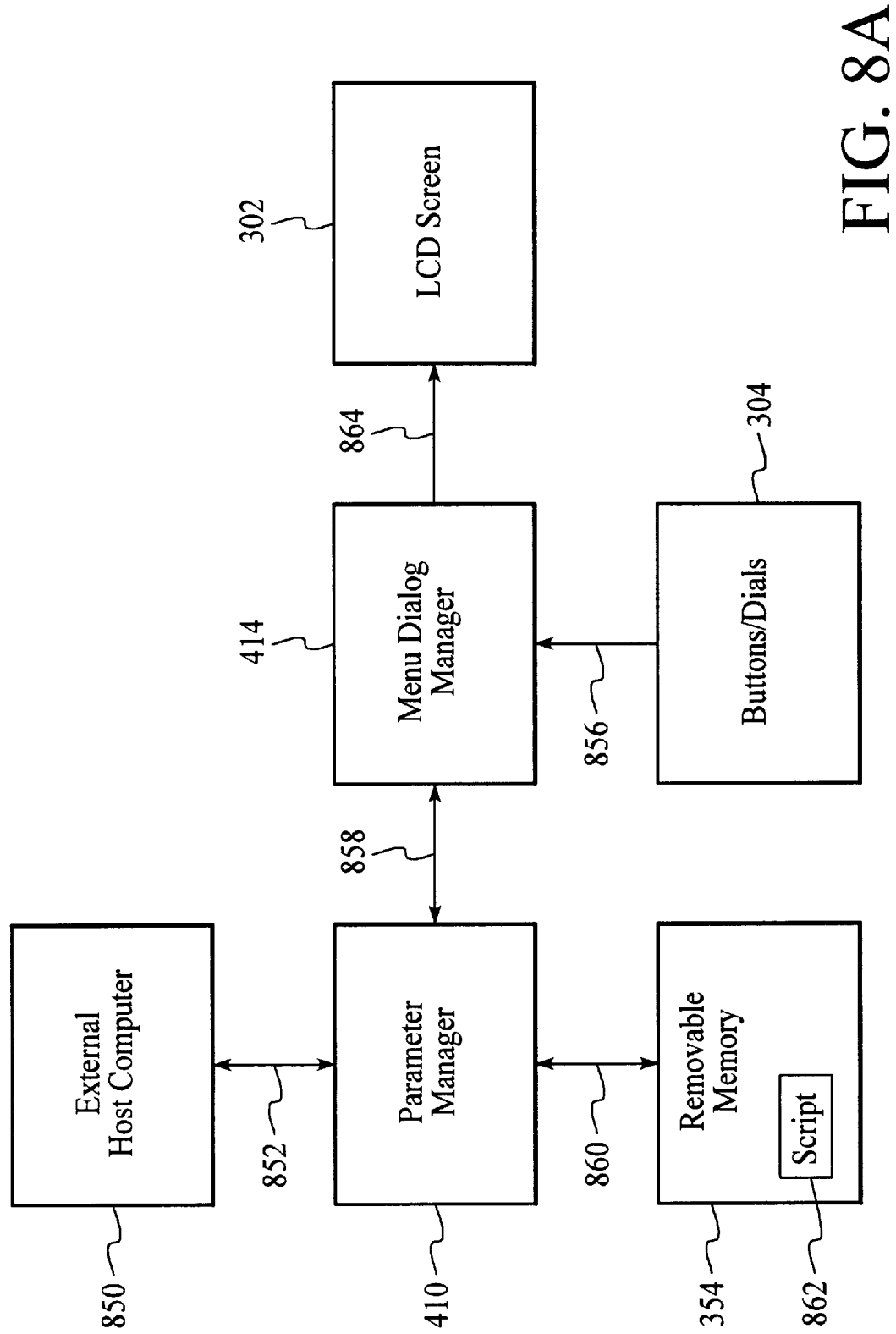
FIG. 8A is a block diagram of a basic system for generating parameter commands, in accordance with the present invention.

Referring now to FIG. 8A, a block diagram of a basic system for generating parameter commands in camera 110 is shown, in accordance with the present invention. The FIG. 8A system includes removable memory 354 (FIG. 3), parameter manager 410, menu dialog manager 414, an external host computer 850, and LCD screen 302 and buttons/dials 304 (both from user interface 308 of camera 110).

Parameter manager 410 includes software routines which advantageously control and coordinate various operating parameters in camera 110, in accordance with the present invention. Parameter manager 410 preferably functions in response to a set of parameter commands which are described below in conjunction with FIGS. 8B through 13. The parameter commands may be generated from several different sources to provide greater flexibility in camera 110. In the preferred embodiment, the parameter commands may be generated directly from user interface 308 of camera 110, from an external host computer 850, or from special parameter scripts 862 provided on removable memory 354 in camera 110.

For example, camera 110 includes menu dialog manager 414 which communicates with parameter manager 410 via line 858 to display parameter information on LCD screen 302 via line 864. A system user may then use buttons/dials 304 to initiate parameter commands via line 856 and to subsequently interact with selected parameters in camera 110.

Furthermore, external host computer 850 may communicate with parameter manager 410 via line 852 to initiate parameter commands and to subsequently interact with selected parameters in camera 110. In addition, removable memory 354 in camera 110 may be flexibly programmed with special parameter scripts 862 that a system user can then selectively execute to initiate and control parameter commands via line 860.

Figure 8B:
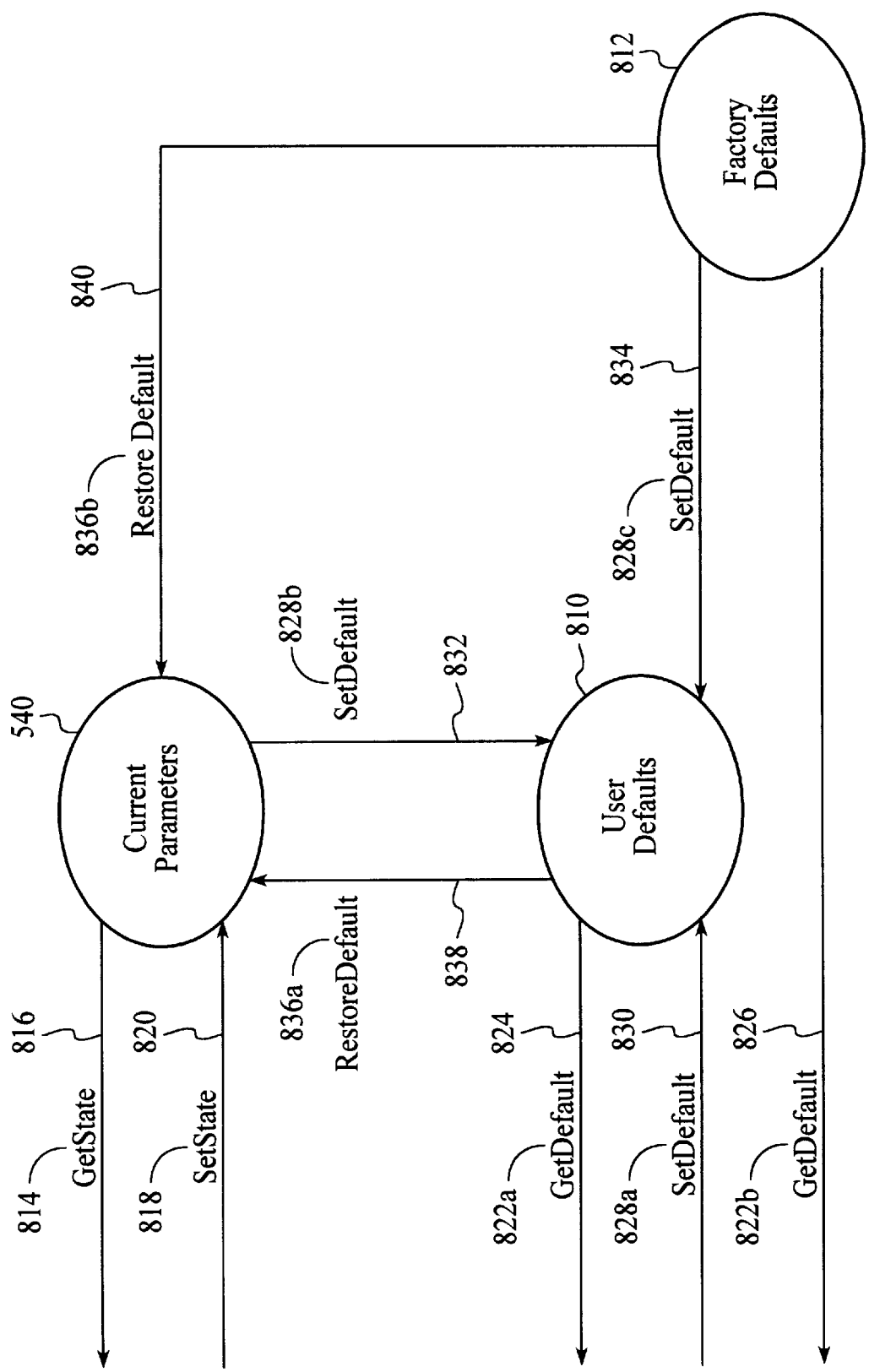
FIG. 8B is a block diagram of the preferred embodiment for controlling parameters in an electronic imaging device, according to the present invention.

Referring now to FIG. 8B, a block diagram of the preferred embodiment for controlling parameters in camera 110 is shown, according to the present invention. The FIG. 8B embodiment includes current parameters 540 (described above in conjunction with FIGS. 5 and 7), user defaults 810 and factory defaults 812. User defaults 810 are adjustable parameter settings which are preferably stored in EEPROM 341 and thus are retained even when camera 110 is powered down. Factory defaults 812 are fixed parameter settings which are preferably stored in non-volatile memory 350 of camera 110.

In alternate embodiments, current parameters 540, user defaults 810 and factory defaults 812 may also be readily implemented using various other hardware and/or software configurations, in accordance with the present invention. Furthermore, in alternate embodiments, the present invention may include various other parameter storage locations in addition to (or instead of) current parameters 540, user defaults 810 and factory defaults 812.

Like current parameters 540, user defaults 810 and factory defaults 812 may also be configured to include a parameter 1 (710(a)) through a parameter "N" (710(d)), as shown above in the FIG. 7 diagram. Furthermore, user defaults 810 and factory defaults 812 may include the parameter examples provided in TABLE I above, or may alternately include various other parameters not specifically listed in TABLE I.

Camera 110 preferably loads user defaults 810 into current parameters 540 during or following each power up sequence so that camera 110 typically starts up with parameter values from user defaults 810. However, when camera 110 is initially powered up after manufacture, the user defaults 810 have not yet been set by a system user. Therefore, factory defaults 812 from non-volatile memory 350 are preferably loaded into user defaults 810 within EEPROM 341. Camera 110 thus initially starts up with parameter values from factory defaults 812.

Camera 110 uses parameter manager 410 to advantageously control and/or access values stored in current parameters 350, user defaults 810 and factory defaults 812. In the preferred embodiment, parameter manager 410 operates in response to a set of commands which include, but are not limited to, a GetState command 816, a SetState command 818, a GetDefault command 822, a SetDefault command 828 and a RestoreDefault command 836. Each of the above commands includes one or more command parameters which, in the following discussion, are bracketed with parentheses for clarity.

The GetState command 814 sends (PName) to request one or more current settings of current parameter(s) 540. The (PName) corresponds to a specific parameter of camera 110. In the preferred embodiment, it may be a symbolic name as shown in TABLE I, or in alternate embodiments, (PName) may simply be a number. In response, parameter manager 410 sends the specified current parameter(s) 540 to the source of the GetState command 814 via path 816. Only if (PName) is NULL does parameter manager 410 return all current parameters 540. Parameter manager 410 then provides the specified current parameter(s) 540 to the source of the GetState command 814.

The SetState command 818 on path 820 preferably sends (PNameValueStruct) to change one or more current settings of current parameters 540. Parameter manager 410 then sets the designated current parameter 540 to a value specified in (PNameValueStruct). Either the user of camera 110 or an external source may generate the SetState command 818 to advantageously update current parameters 540.

The GetDefault command 822(*a*) sends (DefaultSource, PName) to request one or more parameter settings from user defaults 810. The GetDefault command 822(*b*) sends (DefaultSource, PName) to request one or more parameter settings from factory defaults 812. (DefaultSource) specifies whether to utilize user defaults 810 or factory defaults 812 as a source. In response, parameter manager 410 either sends the specified user default(s) 810 via path 824, or sends the specified factory defaults 812 via path 826. If (PName) is NULL, then parameter manager 410 returns all parameters from the selected source. Parameter manager 410 then provides the specified parameter values to either the user of camera 110 or to an external command source (depending on which device generated the GetDefault command 822(*a*) or 822(*b*)).

The SetDefault command 828 preferably sends (UpdateSource, PNameValueStruct) to change one or more current settings of user defaults 810. (UpdateSource) indicates which source is used to update user defaults 810. Parameter manager 410 sets the designated user default(s) 810 specified in (PNameValueStruct). Either the user of camera 110 or an external source may generate the SetDefault command 828(*a*) on path 830 to cause values set with the command to be stored as user defaults 810. SetDefault command 828(*b*) on path 832 causes parameter manager 410 to set the designated user default(s) 810 using current parameters 540 as a source. SetDefault command 828(*c*) on path 834 causes parameter manager 410 to set the designated user default(s) 810 using factory defaults 812 as a source.

The RestoreDefault command 836 preferably sends (DefaultSource, PName) to change one or more current settings of current parameters 540. The RestoreDefault command 836 causes parameter manager 410 to restore the designated current parameter(s) 540 to the current value of the specified source. (DefaultSource) indicates which source is used to restore current parameters 540.

The RestoreDefault command 836(*a*) on path 838 causes parameter manager 410 to restore the designated current parameter(s) 540 with user defaults 810 as a source. The RestoreDefault command 828(*b*) on path 840 causes parameter manager 410 to restore the designated current parameter (s) 540 using factory defaults 812 as a source. If (PName) is NULL, then all values in current parameters 540 are preferably restored to the values in the selected source.

In addition to the foregoing examples, the present invention may also readily include various other parameter commands. For example, the present invention preferably includes a GetCapabilities command which advantageously retrieves information, capabilites and permissable values for selected parameters that are supported in camera 110.

The current parameters 540, user defaults 810 and factory defaults 812, in combination with GetState command 816, SetState command 818, GetDefault command 822, SetDefault command 828 and RestoreDefault command 836 thus provide a flexible and effective system for controlling parameters in camera 110, according to the present invention.

Figure 9:
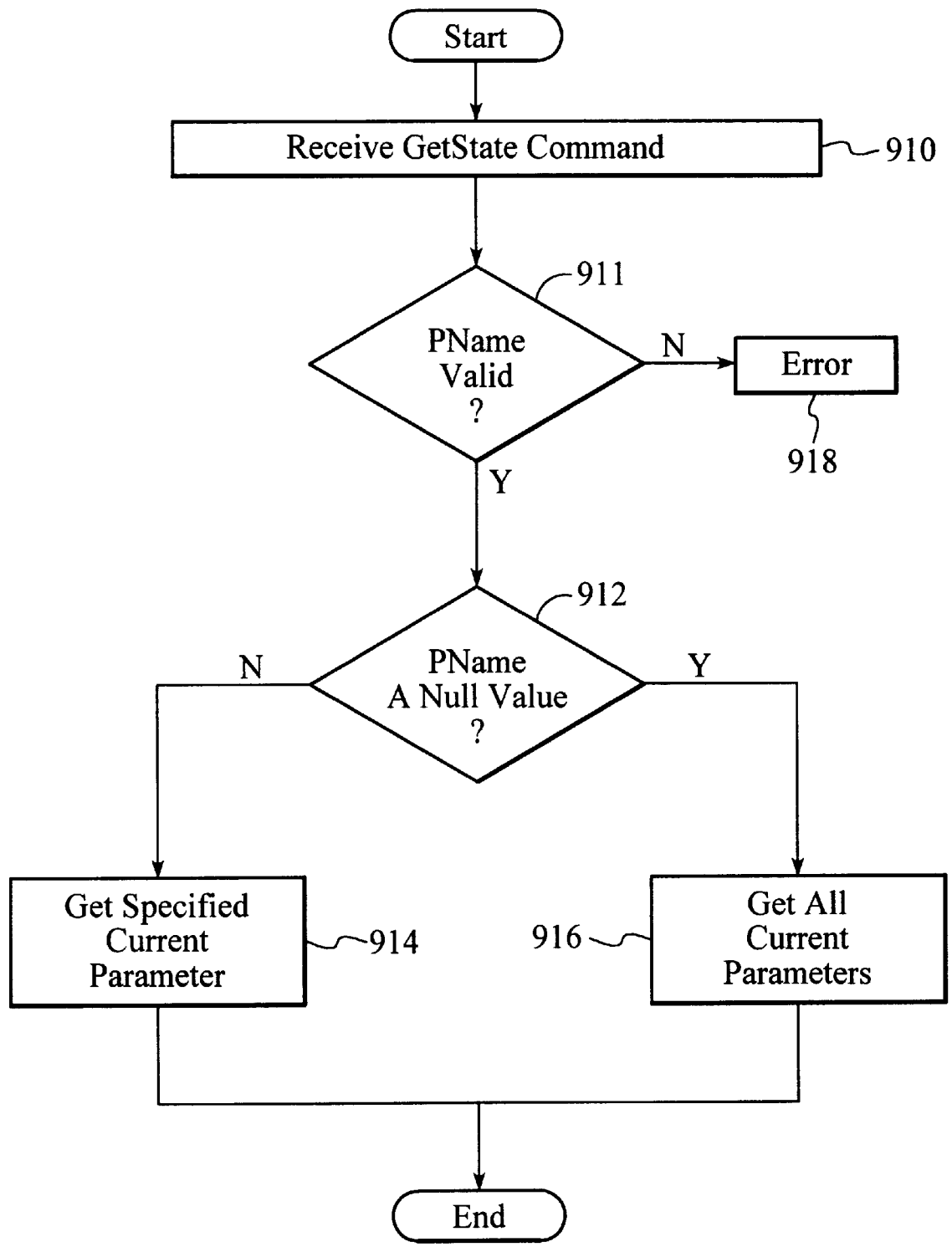
FIG. 9 is a flowchart of method steps for a GetState command, according to the present invention.

Referring now to FIG. 9, a flowchart of method steps for a GetState command 814 is shown, according to the present invention. In step 910, parameter manager 410 receives a GetState command 814 from either a user of camera 110 or from an external command source. Then, in step 911, parameter manager 410 determines whether (PName) within the GetState command is a valid parameter name for camera 110. If so, parameter manager 410, in step 912, determines whether (PName) within the GetState command 814 is a NULL value. If (PName) is not NULL, then parameter manager 410, in step 914, gets and sends the specified current parameter 540 to the source of the GetState command 814. If (PName) is NULL, then parameter manager 410, in step 916, gets and sends all current parameters 540 to the source of the GetState command 814.

Figure 10:
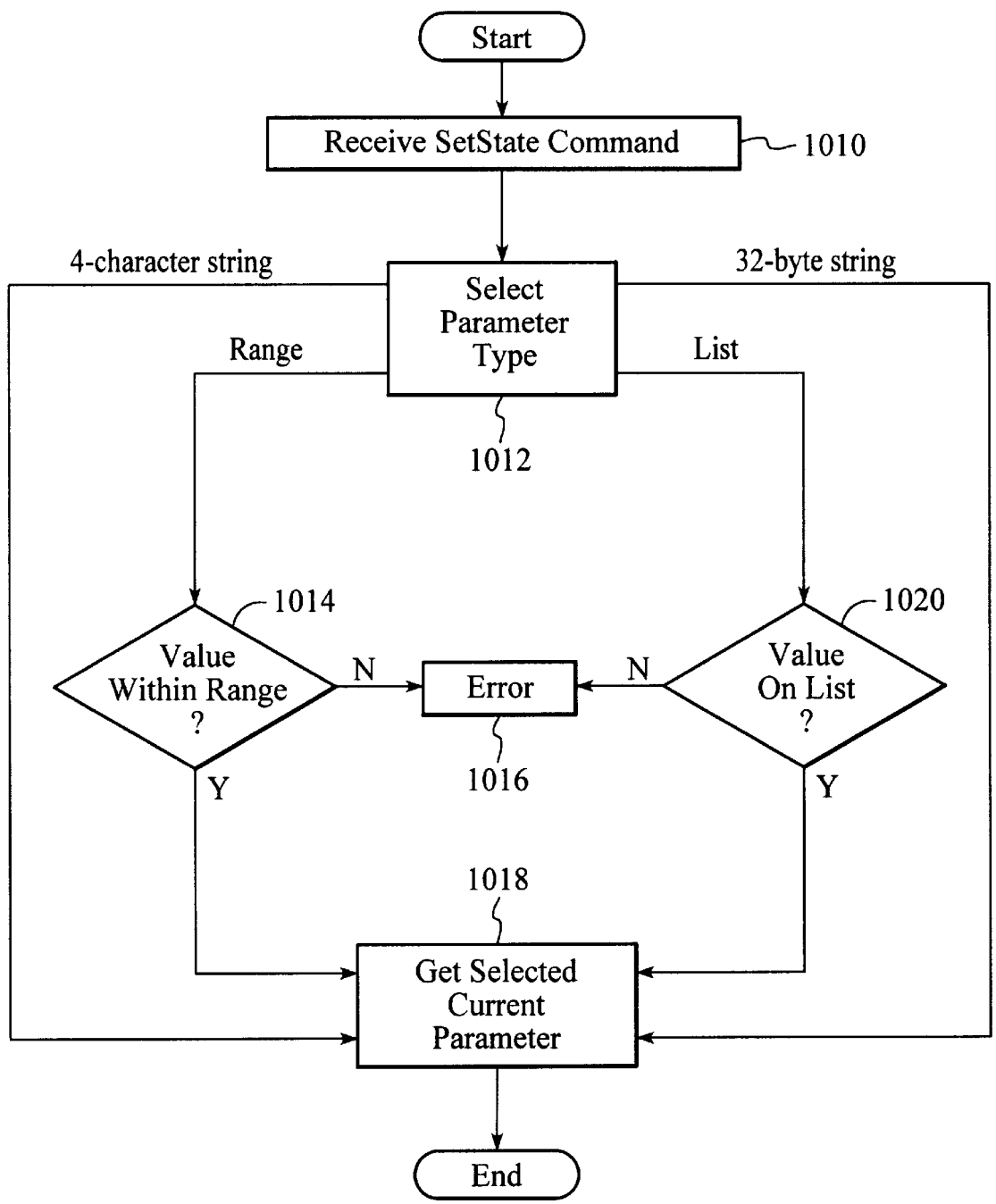
FIG. 10 is a flowchart of method steps for a SetState command, according to the present invention.

Referring now to FIG. 10, a flowchart of method steps for a SetState command 818 is shown, according to the present invention. In step 1010, parameter manager 410 receives a SetState command 818 from either a user of camera 110 or from an external command source. In step 1012, parameter manager 410 selects the appropriate parameter type based on the (PNameValueStruct) within the SetState command 818.

If the parameter type of step 1012 is a 32-byte string or a 4-character string, then the FIG. 10 process goes directly to step 1018. However, if the parameter type is a value range of numbers, then parameter manager 410, in step 1014, determines whether the value specified in the SetState command 818 is within the defined range for that parameter. If within the specified range, then step 1014 proceeds to step 1018. If not within the specified range, then an error is indicated in step 1016. Likewise, if the parameter type is a list of values, then parameter manager 410, in step 1020, determines whether the value specified in the SetState command 818 is on the defined list for that parameter. If on the defined list, then step 1020 proceeds to step 1018. If not on the defined list, then and error is indicated in step 1016. In step 1018, parameter manager 410 then sets the specified current parameter 540 to the value specified in the SetState command 818.

In the preferred embodiment, parameter manager 410 advantageously refers to a resource file to obtain necessary parameter information from a parameter database. The resource file may include, but is not limited to, information like factory defaults, parameter types and parameter values (such as ranges or lists).

Figure 11:
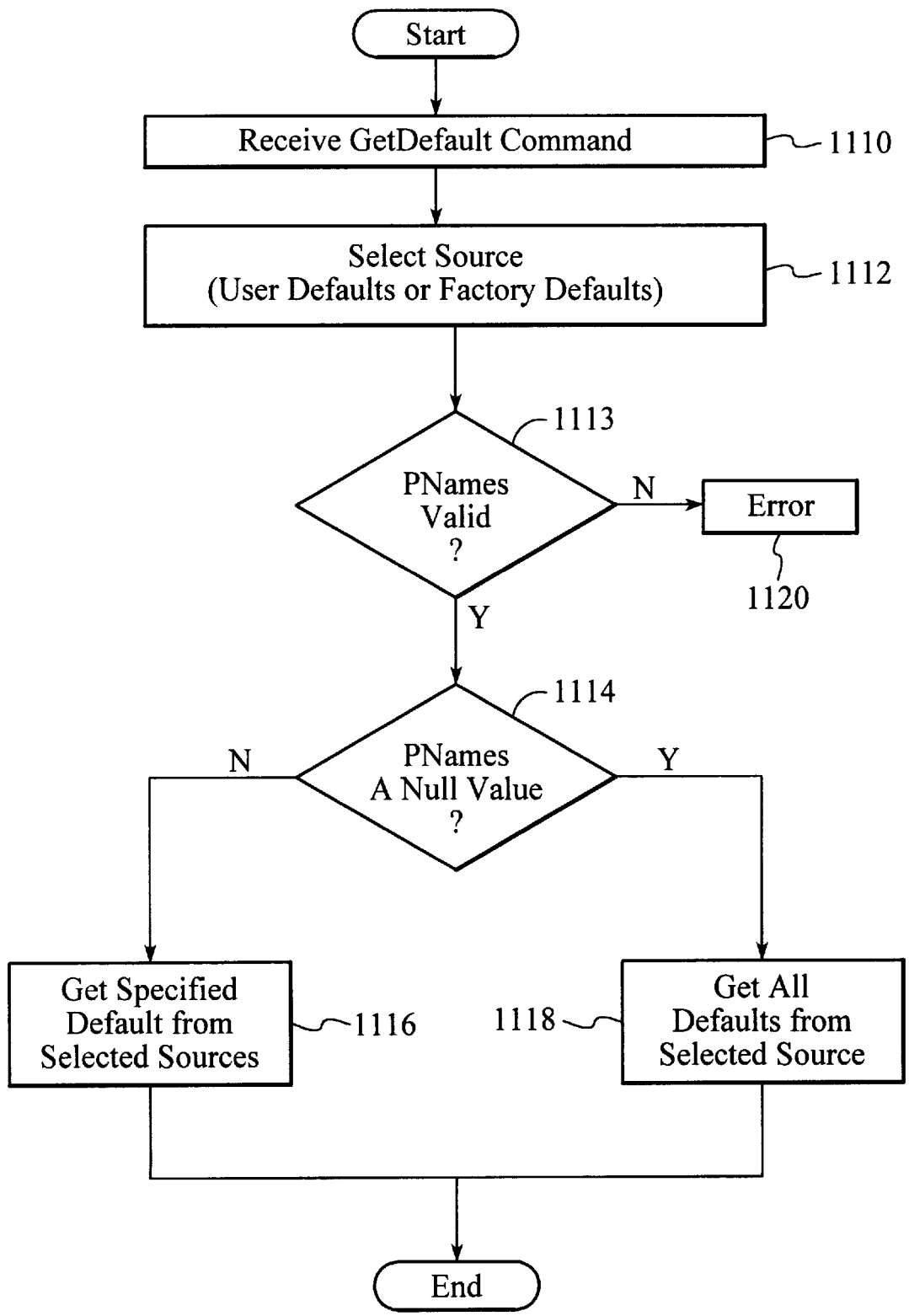
FIG. 11 is a flowchart of method steps for a GetDefault command, according to the present invention.

Referring now to FIG. 11, a flowchart of method steps for a GetDefault command 822 is shown, according to the present invention. In step 1110, parameter manager 410 receives a GetDefault command 822 from either a user of camera 110 or from an external command source. In step 1112, parameter manager 410 selects user defaults 810 or factory defaults 812 as a source, depending on a (DefaultSource) within the GetDefault command 822.

Then, in step 1113, parameter manager 410 determines whether (PName) within the GetDefault command is a valid parameter name for camera 110. If so, parameter manager 410, in step 1114, determines whether (PName) within the GetDefault command 822 is a NULL value. If (PName) is not NULL, then parameter manager 410, in step 1116, gets and sends the value of the specified parameter from the selected source (user defaults 810 or factory defaults 812). If (PName) is NULL, then parameter manager 410, in step 1118, gets and sends the values of all parameters from the selected source (user defaults 810 or factory defaults 812).

Figure 12:
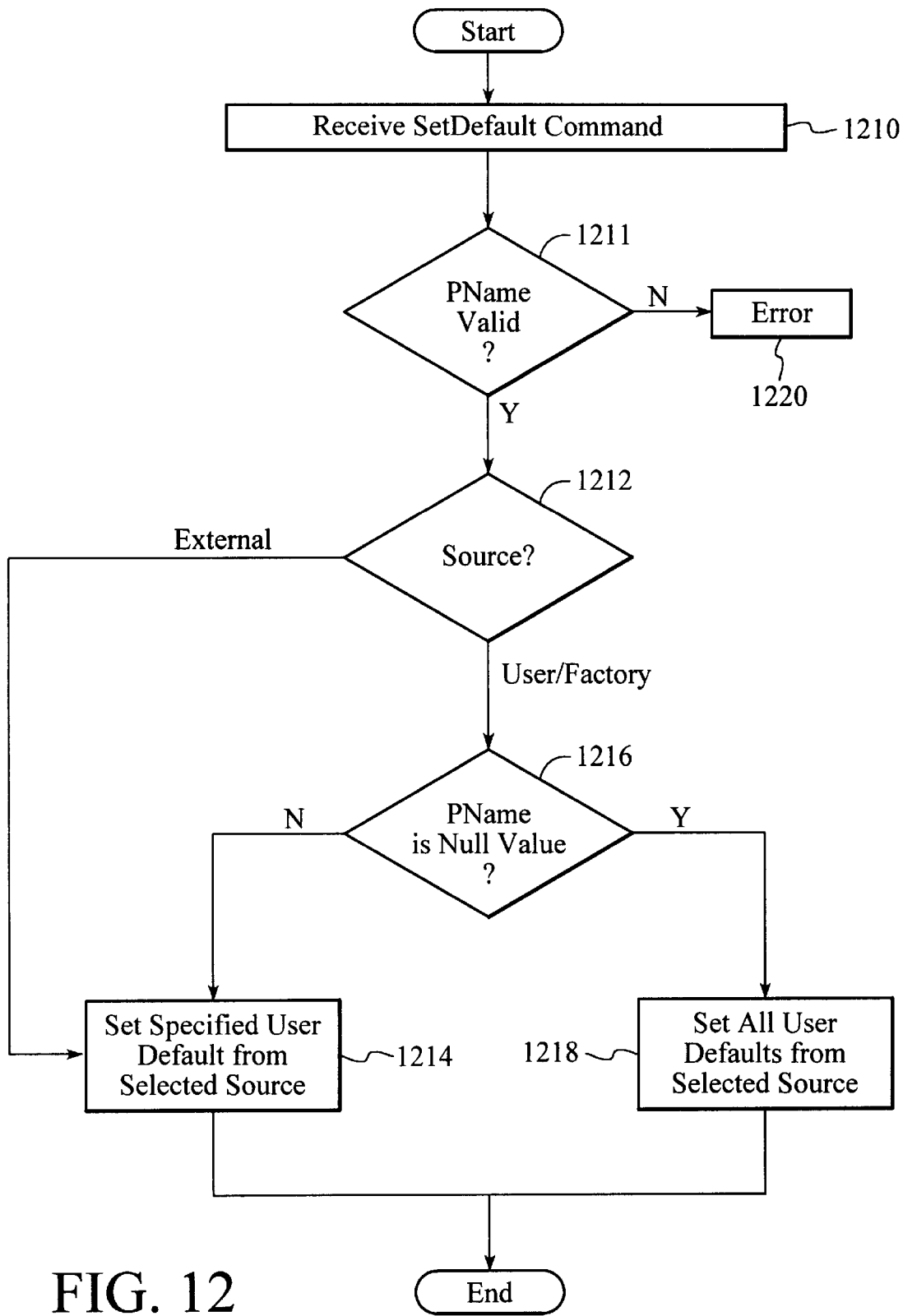
FIG. 12 is a flowchart of method steps for a SetDefault command, according to the present invention.

Referring now to FIG. 12, a flowchart of method steps for a SetDefault command 828 is shown, according to the present invention. In step 1210, parameter manager 410 initially receives a SetDefault command 828 and responsively determines whether the Pname is valid in step 1211. If the PName is valid, then parameter manager 410, in step 1212, determines the source of updating information from (UpdateSource) within SetDefault command 828. If the source is external (from either CPU 344 within camera 110 or from an external command source), then the FIG. 12 process goes directly to step 1214.

However, if parameter manager 410, in step 1212, determines that user defaults 810 or factory defaults 812 are designated as the updating source, then parameter manager 410, in step 1216, determines whether (PName) within the SetDefault command 828 is a NULL value. If (PName) is not NULL, then parameter manager 410, in step 1214, sets the specified parameter using the selected source (external, user defaults 810 or factory defaults 812). If (PName) is NULL, then parameter manager 410, in step 1218, sets all parameters using the selected source (user defaults 810 or factory defaults 812).

Figure 13:
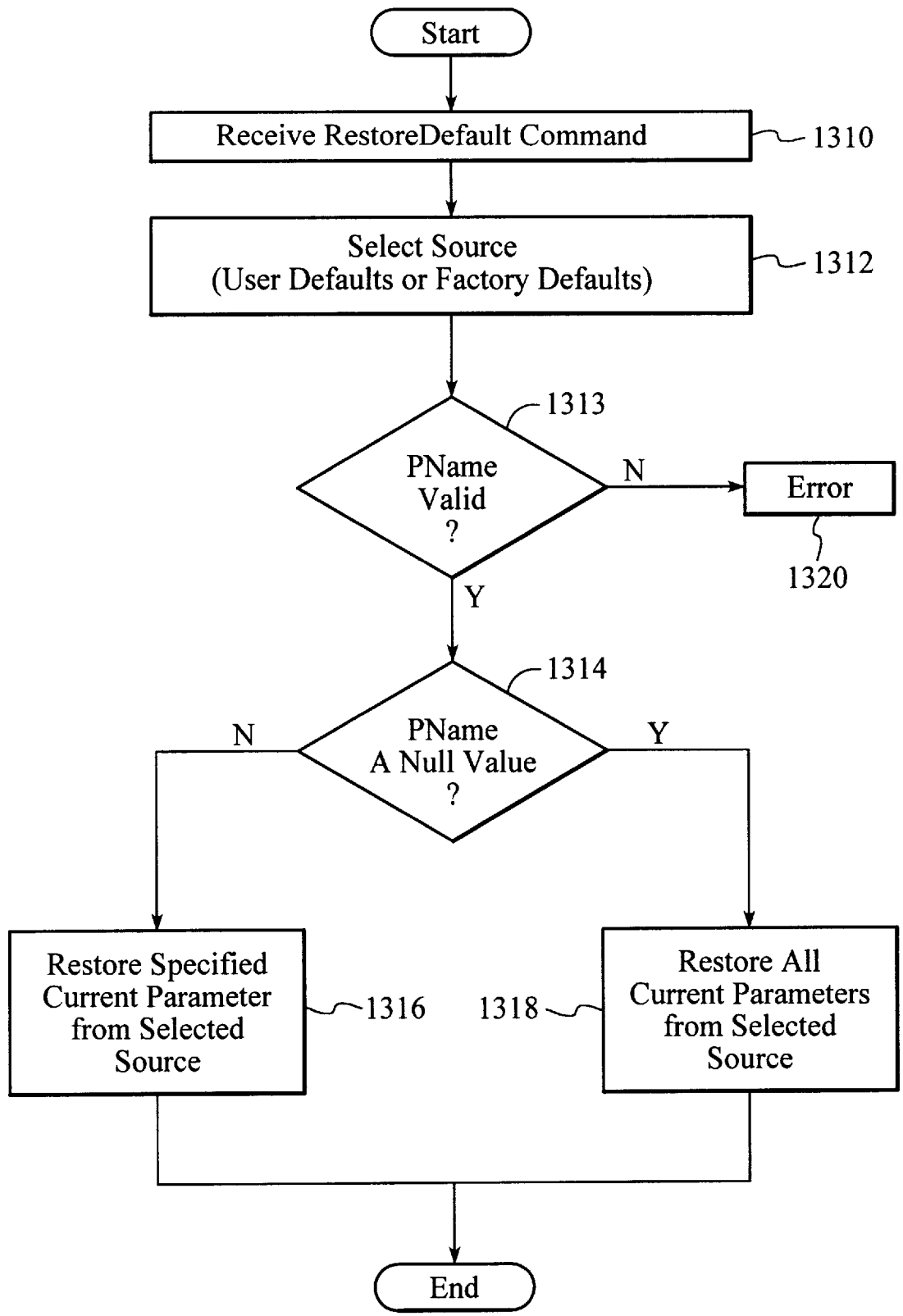
FIG. 13 is a flowchart of method steps for a RestoreDefault command, according to the present invention.

Referring now to FIG. 13, a flowchart of method steps for a RestoreDefault command 836 is shown, according to the present invention. In step 1310, parameter manager 410 initially receives a RestoreDefault command 836. In step 1312, parameter manager 410 selects user defaults 810 or factory defaults 812 as a source, depending on a (DefaultSource) within the RestoreDefault command 836.

Then, in step 1313, parameter manager 410 determines whether (PName) within the RestoreDefault command is a valid parameter name for camera 110. If so, parameter manager 410, in step 1314, determines whether (PName) within the RestoreDefault command 836 is a NULL value. If (PName) is not NULL, then parameter manager 410, in step 1316, restores current parameters 540 to the specified parameter from the selected source (user defaults 810 or factory defaults 812). If (PName) is NULL, then parameter manager 410, in step 1318, restores all parameters in current parameters 540 using the selected source (user defaults 810 or factory defaults 812).

The invention has been explained above with reference to a preferred embodiment. Other embodiments will be apparent to those skilled in the art in light of this disclosure. For example, the present invention may readily be implemented using configurations other than those described in the preferred embodiment above. Furthermore, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for controlling parameters in a hand held electronic device, comprising:
    a series of parameters storage locations coupled to said electronic device for containing value sets corresponding to said parameters, wherein said parameters include an exposure mode specification, focus mode specification, strobe mode specification, zoom position specification, shutter speed specification, and focus distance specification;
    a set of parameter commands for controlling said value sets within said series of parameter storage locations, wherein said set of parameter commands includes a GetCapabilities command which retrieves information, capabilities and permissible values for selected parameters that are supported in said device;
    a plurality of parameter scripts that are selectively chosen by a system user and executed by said device to initiate and control said set of parameter commands; and
    a parameter manager coupled to said electronic device for executing said set of parameter commands to control said value sets corresponding to said parameters.

2. The system of claim 1 wherein said series of parameter storage locations include:
    a current parameters location containing value sets corresponding to current parameters within said electronic device;
    a user defaults location containing value sets corresponding to user defaults within said electronic device; and
    a factory defaults location containing value sets corresponding to factory defaults within said electronic device.

3. The system of claim 2 wherein said current parameters location is in a random-access memory, said user defaults location is in an electrically-erasable programmable read-only memory, and said factory defaults location is in a non-volatile memory.

4. The system of claim 2 wherein said set of parameter commands includes a GetState command which causes said parameter manager to provide one or more of said value sets from said current parameters location to an external command source.

5. The system of claim 2 wherein said set of parameter commands includes a SetState command which causes said parameter manager to set one or more of said value sets in said current parameters location based on information received from an external command source.

6. The system of claim 2 wherein said set of parameter commands includes a GetDefault command which causes said parameter manager to provide one or more of said value sets from said user defaults location to a processor within said electronic device.

7. The system of claim 2 wherein said set of parameter commands includes a SetDefault command which causes said parameter manager to set one or more of said value sets in said user defaults location based on information selectively obtained from one of a processor within said electronic device, an external command source, said current parameters location and said factory defaults location.

8. The system of claim 2 wherein said set of parameter commands includes a RestoreDefault command which causes said parameter manager to restore one or more of said value sets in said current parameters location to information selected from said user defaults location.

9. The system of claim 2 wherein said set of parameter commands are originated by an external command source and wherein said parameter manager responsively accesses parameter information in a resource file to control said parameters.

10. The system of claim 1 wherein said parameter manager acts on all of said parameters in one of said series of parameter locations if a corresponding one of said set of parameter commands does not specify a particular one of said parameters.

11. A method for controlling parameters in a hand held electronic device, comprising said steps of:
    storing value sets corresponding to said parameters into a series of parameter storage locations, wherein said parameters include an exposure mode specification, focus mode specification, strobe mode specification, zoom position specification, shutter speed specification, and focus distance specification;
    providing a set of parameter commands for controlling said value sets within said series of parameter storage locations, wherein said set of parameter commands includes a GetCapabilities command which retrieves information, capabilities and permissible values for selected parameters that are supported in said device;

providing a plurality of parameter scripts that are selectively chosen by a system user and executed by said device to initiate and control said set of parameter commands; and executing said set of parameter commands using a parameter manager to control said value sets corresponding to said parameters.

12. The method of claim 11 wherein said series of parameter storage locations include:

a current parameters location containing value sets corresponding to current parameters within said electronic device;

a user defaults location containing value sets corresponding to user defaults within said electronic device; and a factory defaults location containing value sets corresponding to factory defaults within said electronic device.

13. The method of claim 12 wherein said current parameters location is in a random-access memory, said user defaults location is in an electrically-erasable programmable read-only memory, and said factory defaults location is in a non-volatile memory.

14. The method of claim 12 wherein said set of parameter commands includes a GetState command which causes said parameter manager to provide one or more of said value sets from said current parameters location to a processor within said electronic device.

15. The method of claim 12 wherein said set of parameter commands includes a SetState command which causes said parameter manager to set one or more of said value sets in said current parameters location based on information received from a processor within said electronic device.

16. The method of claim 12 wherein said set of parameter commands includes a GetDefault command which causes said parameter manager to provide one or more of said value sets from said factory defaults location to an external command source.

17. The method of claim 12 wherein said set of parameter commands includes a SetDefault command which causes said parameter manager to set one or more of said value sets in said user defaults location based on information selectively obtained from one of a processor within said electronic device, an external command source, said current parameters location and said factory defaults location.

18. The method of claim 12 wherein said set of parameter commands includes a RestoreDefault command which causes said parameter manager to restore one or more of said value sets in said current parameters location to information selected from said factory defaults location.

19. A computer-readable medium comprising program instructions for controlling parameters in a hand held electronic device by performing said steps of:

storing value sets corresponding to said parameters into a series of parameter storage locations, wherein said parameters include an exposure mode specification, focus mode specification, strobe mode specification, zoom position specification, shutter speed specification, and focus distance specification;

providing a set of parameter commands for controlling said value sets within said series of parameter storage locations, wherein said set of parameter commands includes a GetCapabilities command which retrieves information capabilities and permissible values for selected parameters that are supported in said device;

providing a plurality of parameter scripts that are selectively chosen by a system user and executed by said device to initiate and control said set of parameter commands; and executing said set of parameter commands using a parameter manager to control said value sets corresponding to said parameters.

20. The computer-readable medium of claim 19 wherein said medium is a memory device which is removable from said electronic device for reprogramming, and which contains scripts that execute said set of parameter commands to cause said parameter manager to control said value sets corresponding to said parameters.

21. A system for controlling parameters in a hand held electronic device, comprising:

means for storing value sets corresponding to said parameters into a series of parameter storage locations, wherein said parameters include an exposure mode specification, focus mode specification, strobe mode specification, zoom position specification, shutter speed specification, and focus distance specification;

means for providing a set of parameter commands for controlling said value sets within said series of parameter storage locations, wherein said set of parameter commands includes a GetCapabilities command which retrieves information, capabilities and permissible values for selected parameters that are supported in said device;

means for providing a plurality of parameter scripts that are selectively chosen by a system user and executed by said device to initiate and control said set of parameter commands; and means for executing said set of parameter commands using a parameter manager to control said value sets corresponding to said parameters.

22. A system for controlling parameters in a hand held digital camera, comprising:

a series of parameters storage locations coupled to said digital camera for containing value sets corresponding to said parameters, wherein said parameters include an exposure mode specification, focus mode specification, strobe mode specification, zoom position specification, shutter speed specification, and focus distance specification;

a set of parameter commands for controlling said value sets within said series of parameter storage locations, wherein said set of parameter commands includes a GetCapabilities command which retrieves information, capabilities and permissible values for selected parameters that are supported in said digital camera;

a plurality of parameter scripts that are selectively chosen by a system user and executed by said device to initiate and control said set of parameter commands; and a parameter manager coupled to said digital camera for executing said set of parameter commands to control said value sets corresponding to said parameters, said parameter storage locations including:

a current parameters location containing value sets corresponding to current parameters within said digital camera;

a user defaults location containing value sets corresponding to user defaults within said digital camera;

a factory defaults location containing value sets corresponding to factory defaults within said digital camera; and wherein said current parameters location is in a random-access memory, said user defaults locations is in an electrically-erasable programmable read-only memory, and said factory defaults location is in a non-volatile memory.

23. The system of claim 22 wherein said set of parameter commands includes a GetState command which causes said parameter manager to provide one or more of said value sets from said current parameters location to an external command source.

24. The system of claim 22 wherein said set of parameter commands includes a SetState command which causes said parameter manager to set one or more of said value sets in said current parameters location based on information received from an external command source.

25. The system of claim 22 wherein said set of parameter commands includes a GetDefault command which causes said parameter manager to provide one or more of said value sets from said user defaults location to a processor within said digital camera.

26. The system of claim 22 wherein said set of parameter commands includes a SetDefault command which causes said parameter manager to set one or more of said value sets in said user defaults location based on information selectively obtained from one of a processor within said digital camera, an external command source, said current parameters location and said factory defaults location.

27. The system of claim 22 wherein said set of parameter commands includes a RestoreDefault command which causes said parameter manager to restore one or more of said value sets in said current parameters location to information selected from said user defaults location.

28. The system of claim 22 wherein said set of parameter commands are originated by an external command source and wherein said parameter manager responsively accesses parameter information in a resource file to control said parameters.

29. The system of claim 22 wherein said parameter manager acts on all of said parameters in one of said series of parameter locations if a corresponding one of said set of parameter commands does not specify a particular one of said parameters.

* * * * *

(12) INTER PARTES REEXAMINATION CERTIFICATE (1168th)
United States Patent
Anderson et al.

(10) Number: US 6,134,606 C1
(45) Certificate Issued: Sep. 21, 2015

(54) SYSTEM/METHOD FOR CONTROLLING PARAMETERS IN HAND-HELD DIGITAL CAMERA WITH SELECTABLE PARAMETER SCRIPTS, AND WITH COMMAND FOR RETRIEVING CAMERA CAPABILITIES AND ASSOCIATED PERMISSIBLE PARAMETER VALUES

(75) Inventors: Eric Anderson, San Jose, CA (US); Patricia Scardino, Fremont, CA (US)

(73) Assignee: FLASHPOINT TECHNOLOGY, San Jose, CA (US)

Reexamination Request:
No. 95/001,431, Nov. 26, 2010

Reexamination Certificate for:
Patent No.: 6,134,606
Issued: Oct. 17, 2000
Appl. No.: 08/900,486
Filed: Jul. 25, 1997

(51) Int. Cl.
*H04N 5/232* (2006.01)

(52) U.S. Cl.
CPC ............................... *H04N 5/232* (2013.01)

(58) Field of Classification Search
None
See application file for complete search history.

(56) References Cited

To view the complete listing of prior art documents cited during the proceeding for Reexamination Control Number 95/001,431, please refer to the USPTO's public Patent Application Information Retrieval (PAIR) system under the Display References tab.

*Primary Examiner* — Ovidio Escalante

(57) ABSTRACT

A system and method for controlling parameters in an electronic imaging device comprises a series of parameter storage locations coupled to the imaging device for containing parameter value sets, a set of parameter commands for controlling the parameter value sets, and a parameter manager device for executing the set of parameter commands to control the parameters in the electronic imaging device.

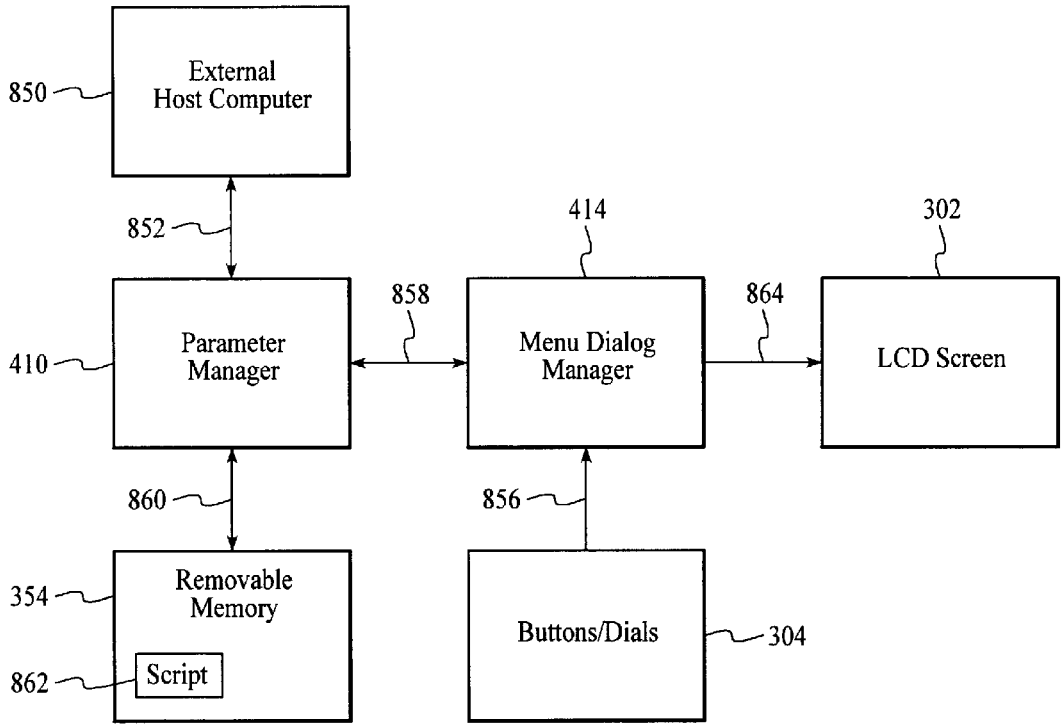

INTER PARTES REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 20 is confirmed.

Claims 1-9, 11-19 and 21-28 are cancelled.

New claims 30-40 are added and determined to be patentable.

Claims 10 and 29 were not reexamined.

30. *The computer-readable medium of claim 20 wherein the electronic device is a hand held digital camera.*

31. *The computer-readable medium of claim 30 wherein the series of parameter storage locations include:*
   *a user defaults location containing value sets corresponding to user defaults within said electronic device and the value sets corresponding to the user defaults are set by the system user; and*
   *a factory defaults location containing value sets corresponding to factory defaults within said electronic device.*

32. *The computer-readable medium of claim 31 wherein the program instructions further perform:*
   *automatically loading, by a central processing unit, the value sets corresponding to the user defaults upon startup of the electronic device instead of the value sets corresponding to the factory defaults once the value sets corresponding to the user defaults are set by the system user.*

33. *The computer-readable medium of claim 32 wherein the program instructions further perform:*
   *automatically loading, by the central processing unit, the value sets corresponding to the factory defaults upon startup of the electronic device when the value sets corresponding to the user defaults have not been set by the system user.*

34. *The computer-readable medium of claim 30 wherein the hand held electronic device includes a central processing unit and a memory, and wherein the parameter manager is a function module that comprises a software routine and is stored in said memory.*

35. *The computer-readable medium of claim 30 wherein the set of parameter commands includes a GetState command which causes the parameter manager to provide the value sets that correspond to current parameters to the system user.*

36. *The computer-readable medium of claim 30 wherein the set of parameter commands includes a SetState command which causes the parameter manager to set certain of the value sets based on information received from a central processing unit within the electronic device.*

37. *The computer-readable medium of claim 30 wherein the set of parameter commands includes a GetDefault command which causes the parameter manager to provide certain value sets from a user defaults location to a central processing unit within said electronic device.*

38. *The computer-readable medium of claim 30 wherein the set of parameter commands includes a SetDefault command which causes the parameter manager to set one or more of the value sets in a user defaults location based on information selectively obtained from a processor.*

39. *The computer-readable medium of claim 30 wherein the set of parameter commands includes a RestoreDefault command which causes said parameter manager to restore one or more of the value sets corresponding to current parameters to information selected from a user defaults location.*

40. *The computer-readable medium of claim 30 wherein the electronic device includes a central processing unit, the series of parameter storage locations, the set of parameter commands, the plurality of parameter scripts, and the parameter manager.*

\* \* \* \* \*